(12) United States Patent
Lindh

(10) Patent No.: US 6,227,074 B1
(45) Date of Patent: May 8, 2001

(54) METHOD OF MANUFACTURING PERFORATING TOOLS

(75) Inventor: Jonas Lindh, Staffanstorp (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/039,442

(22) Filed: Mar. 16, 1998

(30) Foreign Application Priority Data

Mar. 21, 1997 (SE) .................................................... 9701039

(51) Int. Cl.⁷ .............................. B21K 5/20; B26F 1/00
(52) U.S. Cl. .................................................. 76/107.8; 83/660
(58) Field of Search ........................... 76/107.1, 104.1, 76/107.8; 83/660

(56) References Cited

U.S. PATENT DOCUMENTS

| | | | |
|---|---|---|---|
| 1,760,630 | * 5/1930 | Bronander | 76/104.1 |
| 1,814,758 | * 7/1931 | McCarthy | 76/107.1 |
| 2,176,815 | * 10/1939 | Hirohashi | 493/353 |
| 2,458,867 | * 1/1949 | Messersmith | 76/107.8 |
| 2,821,250 | 1/1958 | Järund | 83/343 |
| 3,205,750 | * 9/1965 | Strange | 83/660 |
| 3,255,648 | * 6/1966 | Buttery | 83/862 |
| 3,325,335 | 6/1967 | Martensson | 156/498 |
| 3,347,444 | 10/1967 | Rausing et al. | 229/216 |
| 3,353,738 | 11/1967 | Andreasson | 222/572 |
| 3,463,039 | * 8/1969 | Silver | 83/660 |
| 3,768,344 | * 10/1973 | Feldcamp | 76/107.1 |
| 4,054,074 | 10/1977 | Mårtensson et al. | 83/622 |
| 4,113,101 | 9/1978 | Pupp et al. | 229/201 |
| 4,312,255 | 1/1982 | Holmström | 83/582 |
| 4,620,467 | * 11/1986 | Margraf et al. | 83/389 |
| 4,852,442 | * 8/1989 | Pottorff | 83/697 |
| 4,951,967 | * 8/1990 | Michalik | 83/660 |
| 5,001,956 | * 3/1991 | Nitsch | 83/660 |
| 5,152,059 | * 10/1992 | Midgley | 29/889.7 |
| 5,671,589 | * 9/1997 | Irvine et al. | 53/412 |
| 5,768,969 | * 6/1998 | Dalfiume | 83/660 |

FOREIGN PATENT DOCUMENTS

| | | | |
|---|---|---|---|
| 10291194 | * 11/1998 | (JP) . | |
| 120827 | * 1/1959 | (SU) | 76/107.1 |

* cited by examiner

*Primary Examiner*—Kenneth E. Peterson
*Assistant Examiner*—Stephen Choi
(74) *Attorney, Agent, or Firm*—Burns, Doane, Swecker & Mathis, L.L.P.

(57) ABSTRACT

The invention relates to a method of manufacturing perforating tools, as well as perforating tools manufactured according to the method. The tool is manufactured in that a number of blades (2) are placed densely packed together in a bracket. The blades (2) are, along their one longitudinal side, serrated with a large number of teeth (3). The serrated sides of the densely packed blades (2) form a serrated surface (5). The serrated surface (5) is processed such that the teeth (3) are removed from selected surfaces (8) of the serrated surface (5) and that the remaining teeth (3) form a perforation pattern (7).

3 Claims, 2 Drawing Sheets

METHOD OF MANUFACTURING PERFORATING TOOLS

TECHNICAL FIELD

The present invention relates to a method of manufacturing perforating tools. The present invention also relates to a perforating tool manufactured according to the method.

BACKGROUND ART

In the production of packaging materials of the type employed for liquid packages of the single-use disposable type, the common point of departure is a core layer of paper or paperboard to which are laminated different layers of thermoplastics, and possibly aluminium foil. Hitherto, the standard procedure has been that the ready-laminated packaging material is printed on its outside, to obtain an external artwork decor. The finished packaging material, most often consisting of a material web, is reformed in a filling machine, sealed along a longitudinal joint seam, filled with the contemplated contents, transversely sealed and severed into individual packaging containers which are possibly finally formed into finished packaging containers. The finished packaging containers are often provided with some form of opening arrangement.

Recent times have also seen the introduction of printing direct onto the film which is to constitute the outer layer of the packaging material, and the ready-printed film is thereafter laminated onto the core layer. By such means, it is possible to obtain an improved print quality, at the same time as reducing material losses. This is because the printing is that stage of the production process for packaging material which causes the greatest material loss or wastage. When printing is carried out on the film, only the film thus constitutes waste material or spillage, while it previously consisted of an entire finished packaging material with core layer and all laminate layers.

In the production of the finished packaging material, common practice has also been to provide, in the process, some form of opening arrangement such as perforations, holes for drinking straws, and the like. These arrangements were previously made in the core layer and those places which were employed for the different outer and inner layers were easy to tear off or penetrate.

In order to print direct on the film, which is then laminated onto the core layer, use is made of oriented plastic films, such as oriented polypropylene (OPP-film). These films have a high modulus of elasticity and, when they are employed for the outer layer of the packaging material, they must be pre-treated, i.e. be perforated on sections of the surface before lamination to the core layer takes place. This is because these films display such toughness that they are difficult to tear off or penetrate without a preparatory perforation. They are perforated across a surface which corresponds to or is larger than the tear indication or drinking straw hole which is provided in the core layer.

In order to obtain a perforation surface in a thin plastic film, use has been made of solid tools which are machined from one homogeneous piece and which are surface treated, for example by spark erosion so as to obtain a number of barbs or teeth upstanding from the surface, whose extent corresponds to the desired perforation pattern.

Such tools are intended to be mounted in a roller, two to four tools about the circumference of the roller, depending upon the register length and the size of the roller. The thin plastic film is caused to pass between the roller provided with the tools and a counter roller which is preferably provided with a rubber surface.

These solid tools are expensive to manufacture and they require meticulous and accurate setting on mounting in the roller. It has also proved difficult to manufacture a tool with teeth or barbs so densely packed for the formation of the desirable perforation pattern.

OBJECTS OF THE INVENTION

One object of the present invention is to manufacture a tool for perforating thin plastic films which is economical in manufacture, which requires no extensive fine-adjustments and settings on mounting in place, and which displays a denser tool pattern than prior art tools.

SOLUTION

These and other objects have been attained according to the present invention in that the method of the type described by way of introduction has been given the characterizing features that a number of blades, which, along their one longitudinal side, are serrated with a large number of teeth, are placed closely adjacent one another for the formation of serrated surface; and that the serrated surface is processed such that the teeth are removed from certain parts of the surface and the remaining teeth form a perforation pattern.

Preferred embodiments of the present invention have further been given the characterizing features as set forth in the appended subclaims.

BRIEF DESCRIPTION OF THE ACCOMPANYING DRAWINGS

One preferred embodiment of the present invention will now be described in greater detail hereinbelow, with reference to the accompanying Drawings, in which.

Figure 4:
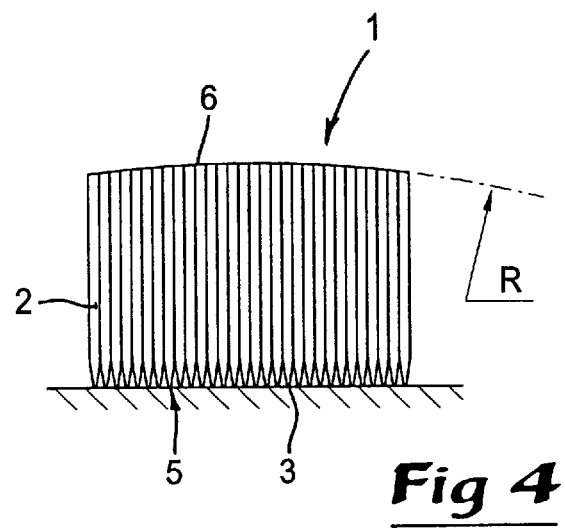
Figure 5:
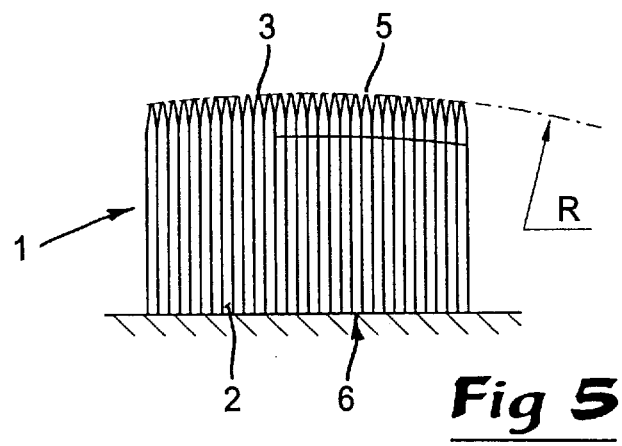
Figure 6:
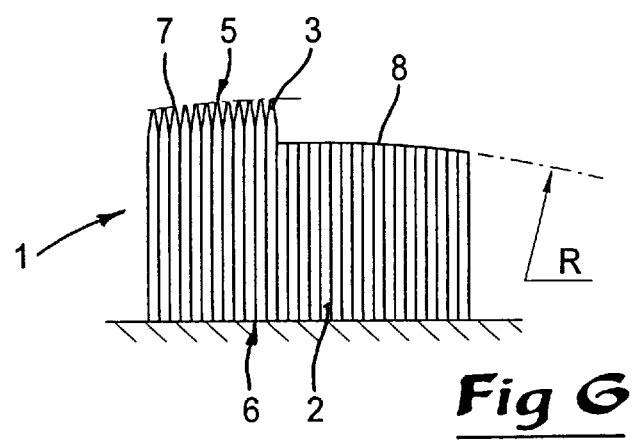

FIGS. 4–6 sow a side elevation of the blades included in the tool at different stages in the manufacturing process.

The Drawings show only those details essential to an understanding of the present invention, and the retainer bracket of the tool, as well as mounting in place on the roller (which are well-known to a person skilled in the art) have been omitted.

DESCRIPTION OF PREFERRED EMBODIMENT

A perforating tool 1 according to the present invention is intended to be used for thin plastic films such as, for example, OPP-film. The plastic film is normally provided with print and is intended to be laminated onto a core layer of paper or plastic, for the formation of a packaging material in which the printed film constitutes the outer layer of the packaging material. Together with different inner layers, there will be obtained a packaging material suitable for liquid packages of the single-use disposable type. These packages normally have some form of opening arrangement, such as a perforation line intended to be torn up or a hole for a drinking straw, intended to be penetrated.

With the film quality which is required to be able print on the film, use must be made of films which have a higher modulus of elasticity, and thereby are relatively tough. In order, in a simple manner, to be able to open the package by tearing along a perforation line or penetrating with a drinking straw into an intended hole for the straw, it is therefore necessary that the film be pre-treated by perforation of that surface which at least corresponds to the perforation line or the drinking straw hole.

The perforating tool 1 according to the present invention is manufactured from a number of thin blades 2 of metal which are of elongate configuration and which, on their one longitudinal side, are serrated, i.e. the entire longitudinal side displays a number of densely positioned teeth 3 or barbs. The blades 2 are of the type normally employed as saw blades for, for example, cutting metal which are mounted in a handsaw or hacksaw intended for the purpose.

Figure 1:
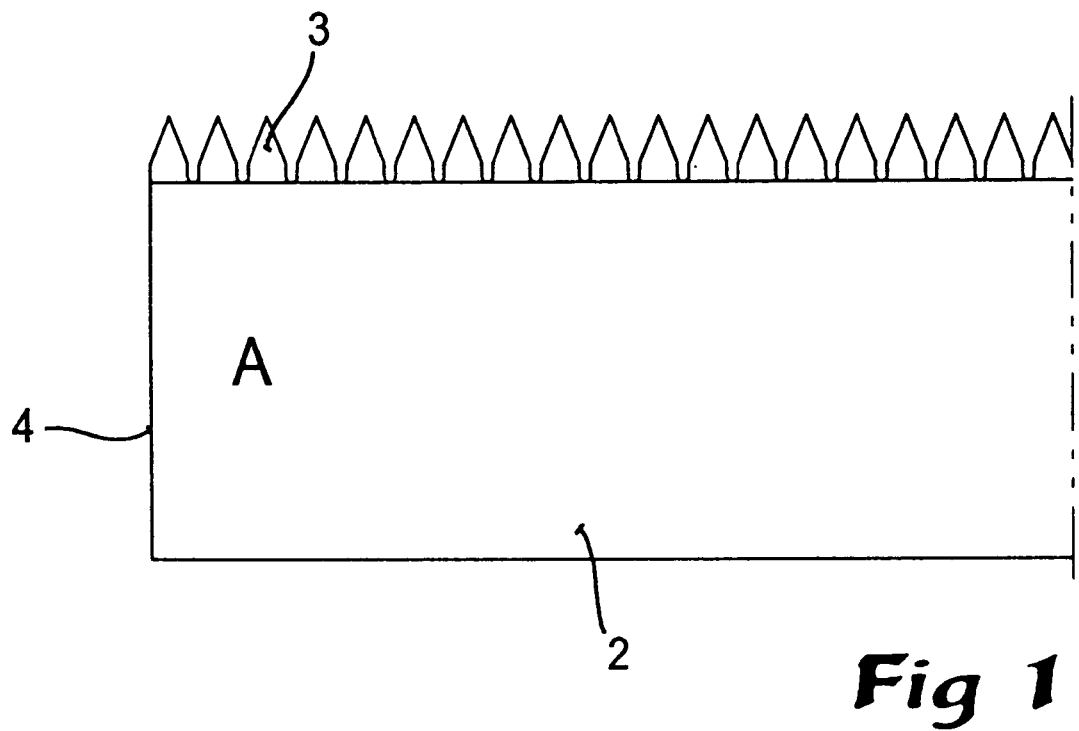
FIG. 1 shows a portion of a blade A in the tool.
Figure 2:
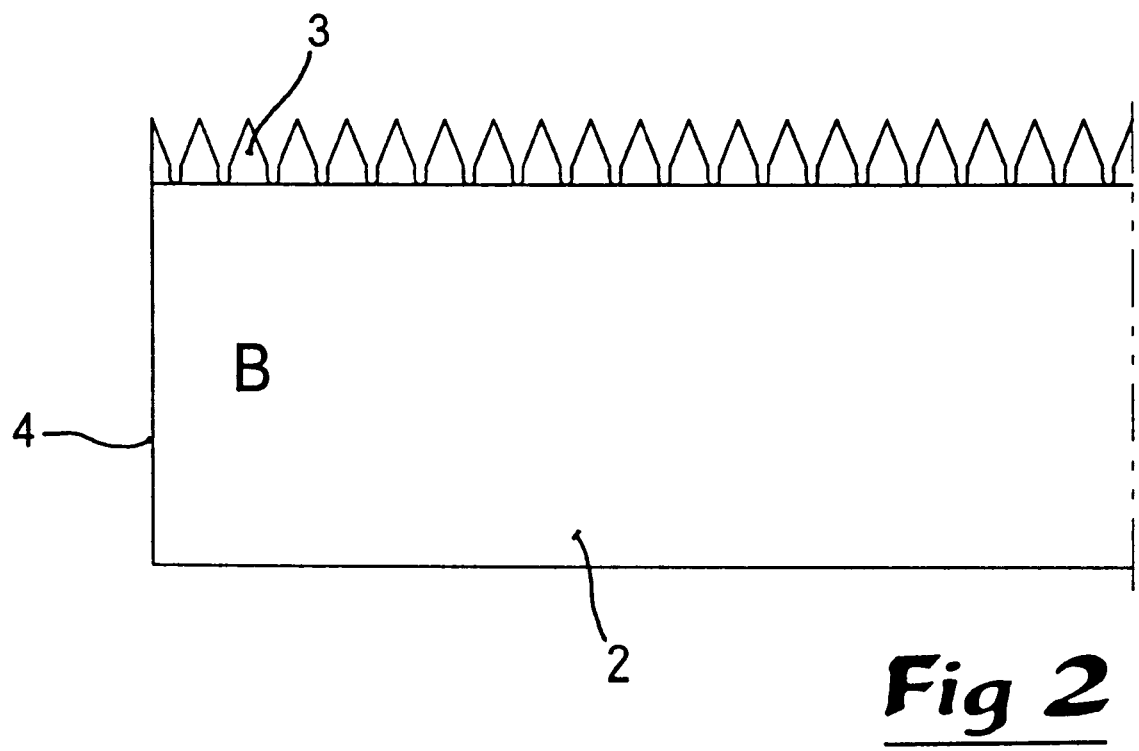
FIG. 2 shows a portion of a blade B in the tool.

The blades 2 in the perforating tool are of two types, A and B. The difference between type A and type B is apparent from FIGS. 1 and 2 and consists of the fact that the blade 2 of type A begins, at its one short end 4, with a complete tooth 3. On the other hand, the blade 2 of type B has, at its one short end 4, a half tooth 3.

A number of blades 2 (the number of blades depending upon the size of the perforation surface which is required) are placed closely adjacent one another. The blades 2 are held together in that they are placed in a bracket (not shown) intended for this purpose. The bracket is to facilitate placing of the perforating tool 1 on a roller. The bracket has for its purpose also to hold together and orientate the blades 2. The closely packed blades 2 will thus form a serrated surface 5. By placing together the blades 2 such that every second blade is of type A and every second of type B, a very dense serrated surface 5 will be obtained.

The blades 2 united together to form a perforating tool 1 are further processed according to the present invention as shown in FIGS. 4–5. First, as shown in FIG. 4, such that the unified blades 2 are placed on a planar substrate with the serrated surface 5 against the planar substrate. The surface 6 facing away from the serrated surface 5 may now be processed for obtaining a desired radius R. The size of the radius depends upon the diameter of the roller on which the tool 1 is to be mounted.

When the unified blades 2 are once again turned so that the opposing surface 6 rests on the planar substrate (FIG. 5), there will automatically be obtained a serrated surface 5 with the desired radius R.

As shown in FIG. 6, the serrated surface 5 is processed, for example, by spark erosion, so that the teeth 3 in certain sections of the serrated surface 5 are removed. The remaining teeth 3 on the serrated surface 5 will thus constitute the perforation pattern 7 surrounded by those surfaces 8 from which the teeth 3 have been removed.

The unified blades 2 processed to form a perforating tool 1 are thereupon placed, still densely packed to one another, in a bracket, the bracket being intended to be mounted on a roller. Between two and four identical tools are placed about the circumference of the roller. The number of tools depends on the desired register length for a given perforation pattern and on the size of the roller.

The thin plastic film which is intended to be perforated is normally already printed and the perforation pattern 7 is applied in register such that the perforation pattern 7 each time arrives at the same spot on the printed artwork decor. Naturally, it is also possible to perforate the film first with a given register length and thereafter print in register against the perforations. Perforation patterns 7 are normally designed so as to have a margin of approx. 2–5 mm in relation to the surface or line on the core layer of the packaging material which the perforation pattern 7 is to cover. A smaller surface may result in reduced stability of the serrated surface 5, which derives its strength from the densely packed teeth 3. A larger surface will, granted, not be seen on the finished packaging material, but an excessively large surface reduces the abutment force of the perforation pattern 7.

Figure 3:
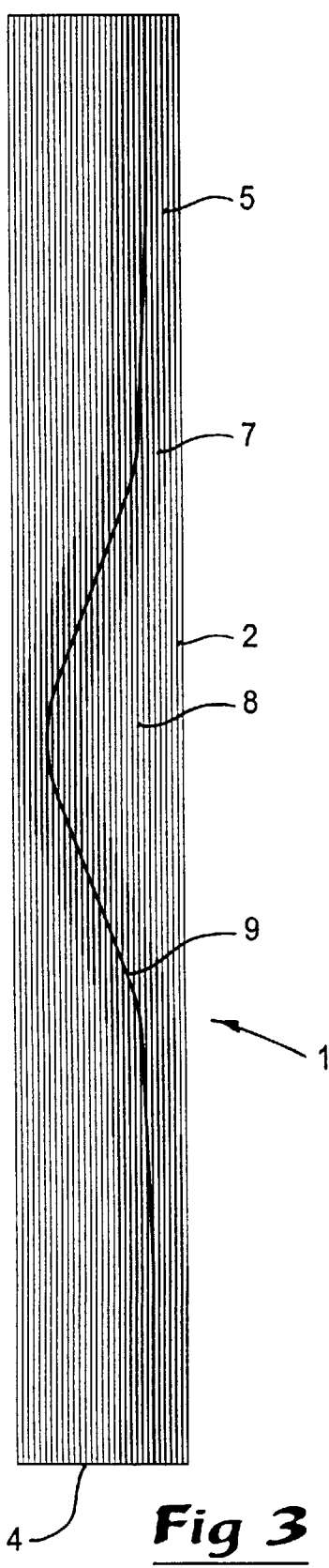
FIG. 3 shows a tool with a specific perforation pattern.

The perforation pattern 7 of the perforating tool 1 as shown in FIG. 3 consists of an area which, on both sides, is to surround a curved perforation line 9 provided on the core layer of a packaging material.

A perforating tool 1 according to the present invention is simple to mount in its bracket and requires but little adjustment on mounting on its intended roller. The tool is economical to manufacture, since it is produced from a standard product which in itself is economical in purchase and requires slight processing in relation to the prior art fixed and solid perforating tool 1. It is also simple to replace damaged parts of the toll, since individual blades 2 are replaced in the densely packed battery of blades 2 which constitutes the perforating tool.

As will have been apparent from the foregoing disclosures, the present invention realises a perforating tool 1 which is economical to manufacture compared with traditional prior art perforating tools and which has a denser serrated surface 5 than it is possible to make in a single, solid tool. Further, the tool 1 is simpler to mount in place and adjust on the perforating roller.

The present invention should not be considered as restricted to that described above and shown on the drawings, many modifications being conceivable without departing from the scope of the appended claims.

What is claimed is:

1. A method of manufacturing perforating tools comprising the steps of:
    arranging a plurality of blades adjacent to each other in a bracket, each of said plurality of blades having a longitudinal side which is serrated with a plurality of teeth, said plurality of teeth of said plurality of blades together forming a serrated surface, each of said plurality of blades including a second longitudinal side opposite said serrated longitudinal side which together form an opposing surface;
    placing said serrated surface against a planar substrate;
    forming a radius R in said opposing surface; and
    removing portions of said plurality of teeth of said serrated surface from a first portion of said serrated surface, the remaining portions of said plurality of teeth forming a perforation pattern.

2. The method in accordance with claim 1, wherein said step of arranging said plurality of blades comprises:
    arranging blades having teeth of a first arrangement and blades having teeth of a second arrangement, said first arrangement and said second arrangement being different; and
    alternatingly arranging each of said plurality of blades adjacent one another so that each blade having teeth of said first arrangement is adjacent to a blade having teeth of said second arrangement.

3. The method in accordance with claim 1, wherein said step of removing portions of said plurality of teeth of said serrated surface further comprises removing said portions by spark erosion to form surfaces without teeth, said surfaces without teeth surrounding said perforation pattern.

* * * * *